(12) United States Patent
Xie (10) Patent No.: US 8,475,895 B2
(45) Date of Patent: Jul. 2, 2013

(54) ARTICLES COMPRISING COMPOSITE STRUCTURES HAVING MOUNTING FLANGES

(75) Inventor: Ming Xie, Beavercreek, OH (US)

(73) Assignee: General Electric Company, Schenectady, NY (US)

( * ) Notice: Subject to any disclaimer, the term of this patent is extended or adjusted under 35 U.S.C. 154(b) by 201 days.

(21) Appl. No.: 11/602,769

(22) Filed: Nov. 21, 2006

(65) Prior Publication Data

US 2008/0118683 A1     May 22, 2008

(51) Int. Cl.
*F01D 25/24* (2006.01)
*F01B 25/16* (2006.01)

(52) U.S. Cl.
USPC ..... 428/34.5; 428/34.1; 428/34.4; 428/411.1; 428/176; 415/9; 415/170.1

(58) Field of Classification Search
USPC ....... 60/226.1; 415/119; 425/110; 428/411.1, 428/176, 34.1
See application file for complete search history.

(56) References Cited

U.S. PATENT DOCUMENTS

| 4,534,698 | A | 8/1985 | Tomich | |
|---|---|---|---|---|
| 5,112,191 | A * | 5/1992 | Strock et al. | ..... 416/94 |
| 5,431,532 | A | 7/1995 | Humke et al. | |
| 5,823,739 | A | 10/1998 | Van Duyn | |
| 6,059,524 | A | 5/2000 | Costa et al. | |
| 6,290,455 | B1 | 9/2001 | Hemmelgarn et al. | |
| 6,375,410 | B2 | 4/2002 | Clouse et al. | |
| 6,843,449 | B1 | 1/2005 | Manteigna et al. | |
| 7,063,505 | B2 | 6/2006 | Czachor | |
| 7,246,990 | B2 | 7/2007 | Xie et al. | |
| 2006/0134251 | A1 * | 6/2006 | Blanton et al. | ..... 425/110 |
| 2006/0201135 | A1 * | 9/2006 | Xie et al. | ..... 60/226.1 |
| 2008/0072569 | A1 * | 3/2008 | Moniz et al. | ..... 60/226.1 |

FOREIGN PATENT DOCUMENTS

| JP | 60-001361 A | 1/1985 |
|---|---|---|
| JP | 08-061148 A | 3/1996 |
| JP | 10-089150 A | 4/1998 |
| JP | 11-324615 A | 11/1999 |
| JP | 2003-530505 A | 10/2003 |
| JP | 2005-009479 A | 1/2005 |
| JP | 2005-271907 A | 10/2005 |
| JP | 2006-177364 A | 7/2006 |
| JP | 2001-200798 A | 9/2011 |

OTHER PUBLICATIONS

Japanese Office Action issued Nov. 22, 2011 in corresponding JP Application No. 2007-300080 with unofficial English translation.

* cited by examiner

*Primary Examiner* — Ellen S Raudenbush
(74) *Attorney, Agent, or Firm* — General Electric Company; David J. Clement; William Scott Andes (57) ABSTRACT

Articles including a primary composite structure having a circumference, at least one mounting flange operably connected to the primary composite structure about the circumference, the mounting flange having at least one circumferentially oriented core fiber.

17 Claims, 9 Drawing Sheets

ARTICLES COMPRISING COMPOSITE STRUCTURES HAVING MOUNTING FLANGES

TECHNICAL FIELD

Embodiments described herein generally relate to articles having integral mounting flanges disposed thereon. More particularly, embodiments herein generally describe articles including composite structures having integral mounting flanges for operably connecting a secondary structure thereto.

BACKGROUND OF THE INVENTION

In gas turbine engines, such as aircraft engines, air is drawn into the front of the engine, compressed by a shaft-mounted compressor, and mixed with fuel in a combustor. The mixture is then burned and the hot exhaust gases are passed through a turbine mounted on the same shaft. The flow of combustion gas expands through the turbine which in turn spins the shaft and provides power to the compressor. The hot exhaust gases are further expanded through nozzles at the back of the engine, generating powerful thrust, which drives the aircraft forward.

Because engines operate in a variety of conditions, foreign objects may sometimes undesirably enter the engine. More specifically, foreign objects, such as large birds, hailstones, sand and rain may be entrained in the inlet of the engine. As a result, these foreign objects may impact a fan blade and cause a portion of the impacted blade to be torn loose from the rotor, which is commonly known as fan blade out. The loose fan blade may then impact the interior of the fan casing causing a portion of the casing to bulge or deflect. This deformation of the casing may result in increased stresses along the entire circumference of the engine casing.

In recent years composite materials have become increasingly popular for use in a variety of aerospace applications because of their durability and relative lightweight. Although composite materials can provide superior strength and weight properties, and can lessen the extent of damage to the fan casing during impacts such as blade outs, designing flanges on structures fabricated from composite materials still remains a challenge.

Laminated composite structures generally have superior strength in-plane due to the presence of continuous reinforcing fibers. However, issues may arise when attaching a secondary structure to an interposing flange located about the body of the composite structure, as opposed to about an end of the composite structure. Such issues are due to a general lack of continuous fibers at the points of attachment, or joints, between the flange and primary composite structure. This, in addition to significant out-of-plane loads caused by the weight of the secondary structure, may result in a weak attachment joint that is susceptible to damage from increased stresses, such as those resulting from a fan blade out or those inherently present due to the weight of the secondary structure.

To address such weaknesses at the point of attachment, it may be desirable to provide supplementary reinforcement to the joints of the mounting flange, such as additional fibers or metal brackets. However, with the addition of these reinforcements, the weight-saving benefits provided by using composite structures can be significantly reduced. Moreover, even with additional reinforcement, the mounting flange may still not be strong enough to adequately support the weight of the attached secondary structure, with or without the additional stresses caused by a blade out. Ultimately, continuous stresses on the already weakened flange may result in catastrophic failure to one or more of the primary composite structure, the attached secondary structure, the engine or the aircraft.

Accordingly, there remains a need for articles comprising composite structures having integral mounting flanges that provide the desired attachment without the previously described weight or failure issues.

BRIEF DESCRIPTION OF THE INVENTION

Embodiments herein generally relate to articles comprising a primary composite structure having a circumference, at least one mounting flange operably connected to the primary composite structure about the circumference wherein the mounting flange comprises at least one circumferentially oriented core fiber.

Embodiments herein also generally relate to articles comprising a primary composite structure having a circumference, at least one mounting flange comprising at least one circumferentially oriented core fiber, and at least one layer of attachment fibers operably connecting the core fiber to the primary composite structure about the circumference.

Embodiments herein also generally relate to articles comprising an engine comprising a primary composite structure having a circumference, at least one mounting flange operably connected to the primary composite structure about the circumference, the mounting flange comprising a plurality of circumferentially oriented core fibers, the core fibers having a first core side and a second core side, at least one layer of attachment fibers operably connecting each of the first core side and the second core side of the core fibers to the primary composite structure about the circumference, and a secondary structure operably connected to the primary composite structure at the mounting flange.

These and other features, aspects and advantages will become evident to those skilled in the art from the following disclosure.

BRIEF DESCRIPTION OF THE DRAWINGS

While the specification concludes with claims particularly pointing out and distinctly claiming the invention, it is believed that the embodiments set forth herein will be better understood from the following description in conjunction with the accompanying figures, in which like reference numerals identify like elements.

DETAILED DESCRIPTION OF THE INVENTION

Integral Composite Mounting Flanges

Embodiments described herein generally relate to articles comprising a primary composite structure having at least one mounting flange operably connected thereto that can reduce the occurrence of severe part damage to both the primary composite structure and an attached secondary structure, while concurrently helping to eliminate catastrophic part failure. While embodiments herein may generally focus on integral mounting flanges on composite fan casings of gas turbine engines, it will be understood by those skilled in the art that the description should not be limited to such. Indeed, as the following description explains, the integral mounting flange described herein may be utilized on any generally cylindrically-shaped composite structure.

Figure 1:
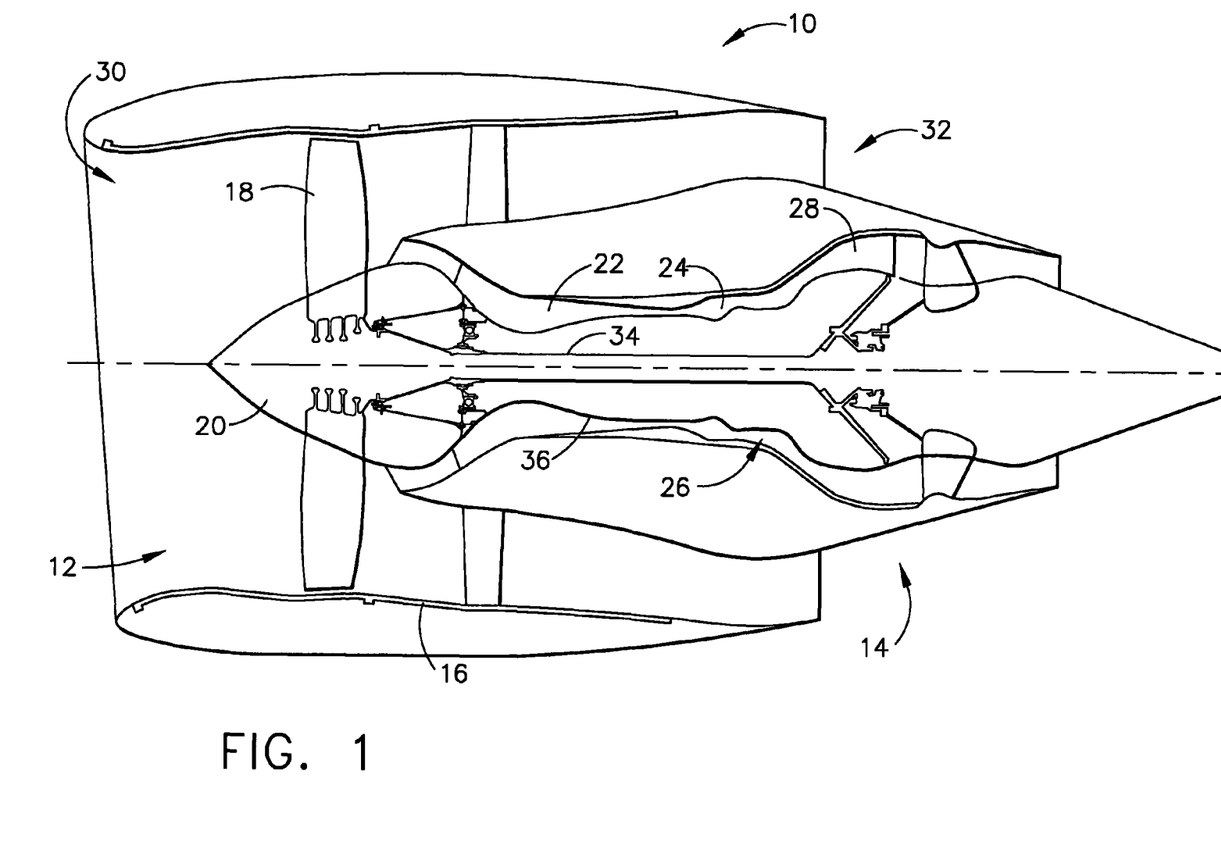
FIG. 1 is a schematic cross-sectional view of one embodiment of a gas turbine engine.

Turning to the figures, FIG. 1 is a schematic representation of one embodiment of a gas turbine engine 10 that generally includes a fan assembly 12 and a core engine 14. Fan assembly 12 may include a fan casing 16 and an array of fan blades 18 extending radially outwardly from a rotor disc 20. Core engine 14 may include a high-pressure compressor 22, a combustor 24, a high-pressure turbine 26 and a low-pressure turbine 28. Engine 10 has an intake side 30 and an exhaust side 32. Fan assembly 12 and low-pressure turbine 28 may be coupled by a first rotor shaft 34 while high-pressure compressor 22 and high-pressure turbine 26 may be coupled by a second rotor shaft 36.

Figure 2:
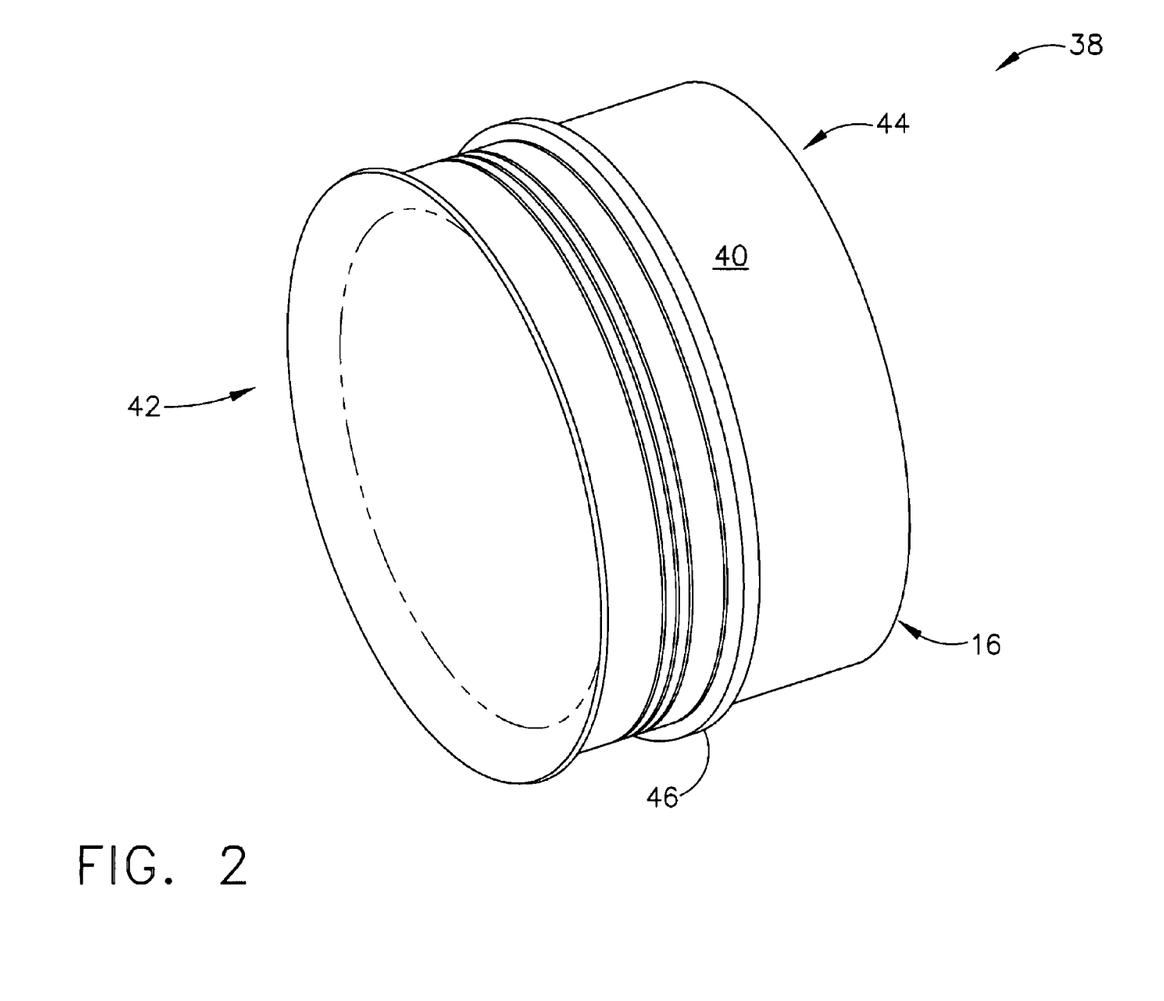
FIG. 2 is a schematic view of one embodiment of a fan casing having a mounting flange.

FIG. 2. illustrates one embodiment of an acceptable primary composite structure 38. As used herein, "composite structure (preform)" refers to any component, or preform thereof, fabricated from composite materials. Composite structure 38 may comprise a generally cylindrical member, such as fan casing 16. Henceforth, the cylindrical member will be referred to as fan casing 16, though it should not be limited to such. Fan casing 16 may be generally cylindrical in shape and may be fabricated from any acceptable material. In one embodiment, however, fan casing 16 may be fabricated from a composite material, such as, but not limited to, glass fibers, graphite fibers, carbon fibers, ceramic fibers, aromatic polyamide fibers such as poly(p-phenylenetherephtalamide) fibers (i.e. KEVLAR®), and combinations thereof. In one embodiment, the composite material may comprise carbon fibers. Additionally, fan casing 16 may be fabricated using any acceptable fabrication method known to those skilled in the art. See, for example, U.S. Patent Application No. 2006/0201135 to Xie et al.

Fan casing 16 may generally comprise a body 40 having a forward end 42 and an aft end 44. As used herein, "fan casing" is used to refer to both pre- and post-cure composite fan casings. Those skilled in the art will understand which stage is being referenced from the present description. Fan casing 16 may also comprise at least one integral composite mounting flange 46. As used herein, "mounting flange" refers to any flange interposed circumferentially about body 40 of fan casing 16, or other primary composite structure, that may be used to operably connect a secondary structure to the primary structure, as described herein below. By "interposed" it is meant that mounting flange 46 may be located circumferentially about body 40 of fan casing 16, as opposed to about either of forward end 42 or aft end 44.

Figure 3:
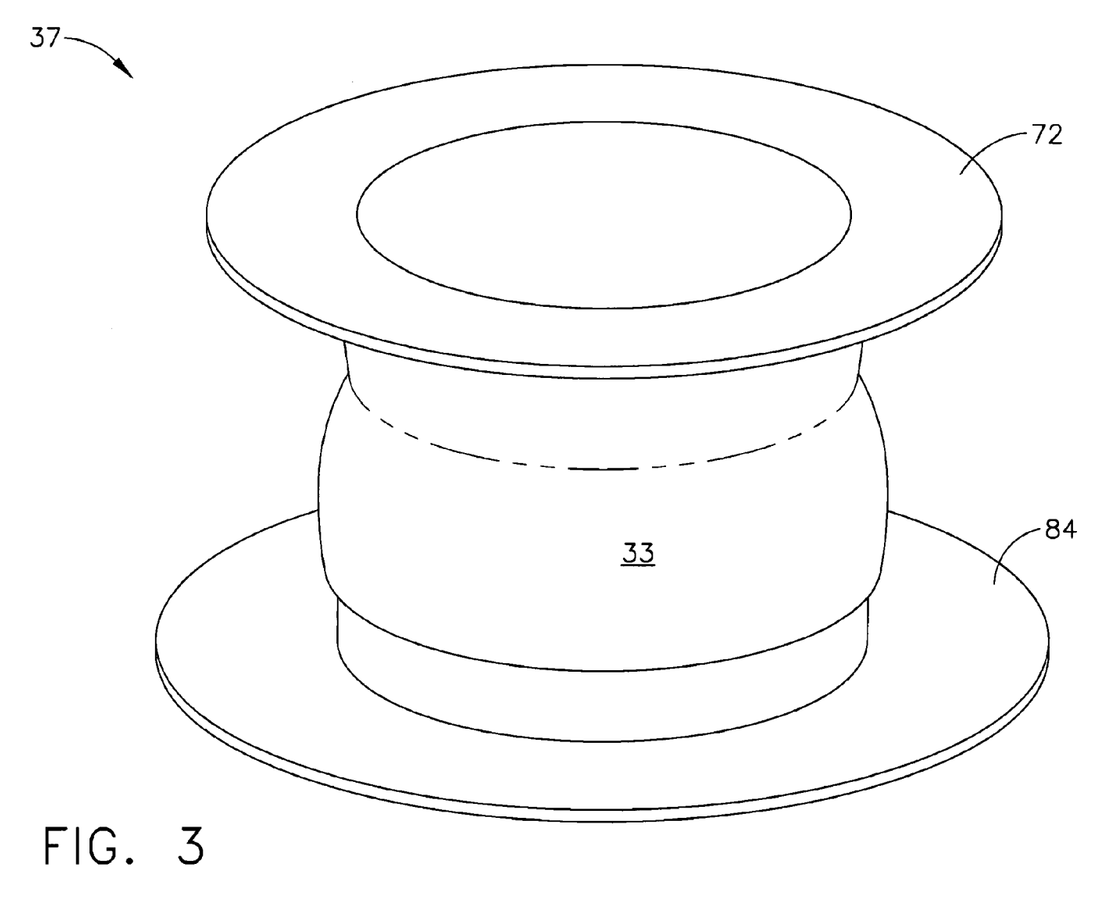
FIG. 3 is a schematic perspective view of one embodiment of a composite structure forming tool.

Fan casing 16 may also be fabricated using any tool known to those skilled in the art. See, for example, U.S. Patent Application No. 2006/0134251 to Blanton et al. In one embodiment, as shown in FIG. 3, composite structure forming tool 37 may have a circumference, a generally cylindrically shaped core 33, and comprise a first endplate 72 and a second endplate 84 that may be removeably attached to core 33 of tool 37.

Figure 4:
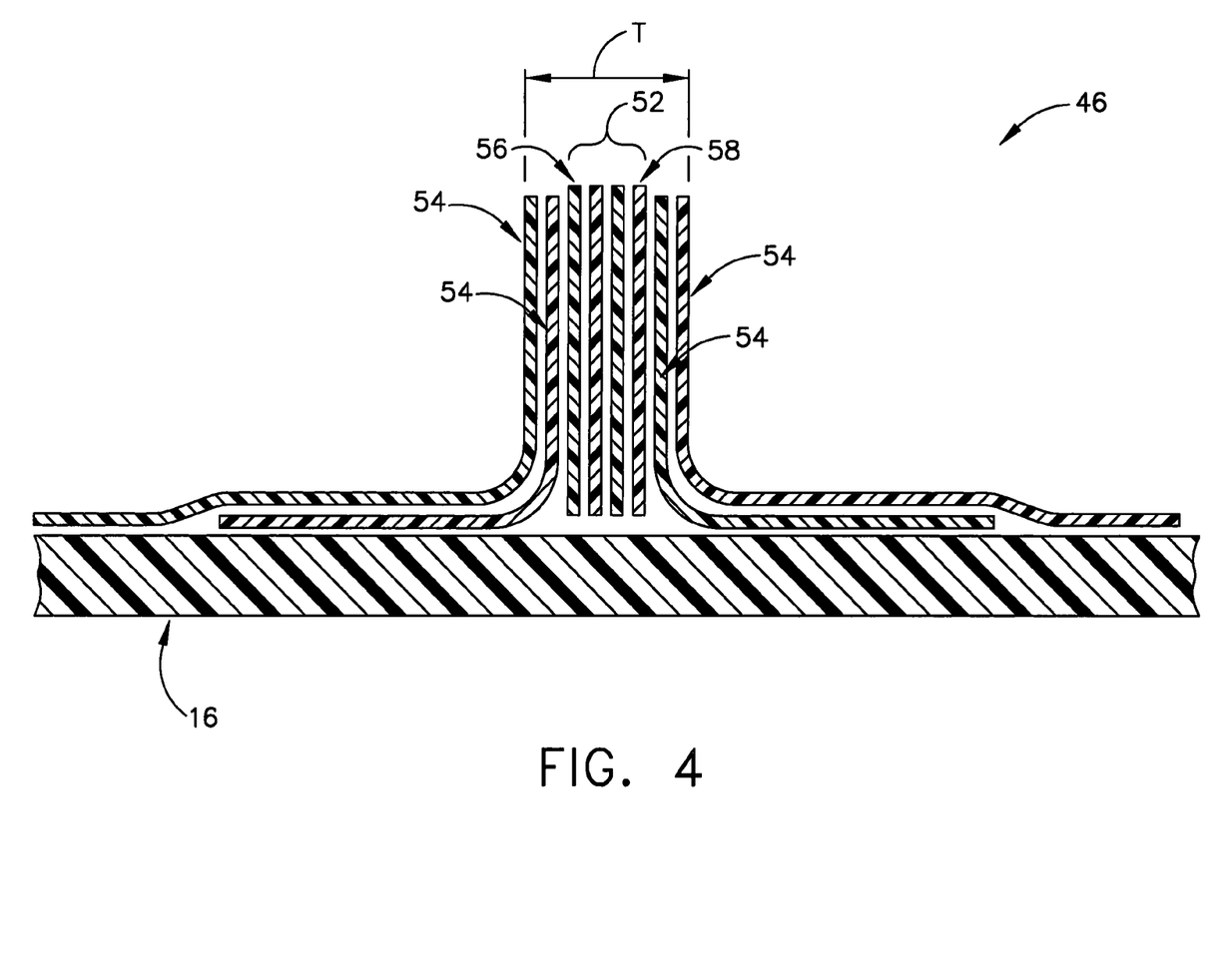
FIG. 4 is a schematic cross-sectional view of one embodiment of a mounting flange operably connected to a fan casing.

Turning to FIG. 4, integral composite mounting flange 46 may generally include at least one core fiber 52, though in one embodiment mounting flange 46 may comprise a plurality of core fibers 52. Core fibers 52 may be circumferentially oriented about fan casing 16. By "circumferentially oriented" it is meant that core fibers 52, whether fiber tows, textile preforms or a combination thereof, generally circumscribe fan casing 16 and are continuous in the circumferential direction. Mounting flange 46 may also generally comprise at least one layer of multidirectional attachment fibers 54 that may operably connect core fibers 52 to fan casing 16 as described herein below. As used herein, "multidirectional" refers to textile preforms comprising the attachment fibers that have fiber tows oriented in more than one direction.

As will be understood by those skilled in the art, core fibers 52 may be fabricated in different ways. In one embodiment, core fibers 52 may be fabricated from a plurality of continuous, unidirectional fiber tows bundled and bonded together. In another embodiment, core fibers 52 may comprise textile preforms, such as a flattened biaxial braid sleeve, having a majority of fiber tows that are continuous in the circumferential direction, and the remaining fibers either continuous or non-continuous in the non-circumferential direction. It is this general circumferential orientation of core fibers 52 that can provide added strength to the flange in the circumferential direction as explained herein below. Regardless of the particular assembly utilized, core fibers 52 may comprise a first core side 56 and a second core side 58.

Fiber tows of core fibers 52 may be comprised of any suitable reinforcing fiber known to those skilled in the art, including, but not limited to, glass fibers, graphite fibers, carbon fibers, ceramic fibers, aromatic polyamide fibers such as poly(p-phenylenetherephtalamide) fibers (i.e. KEVLAR®), and combinations thereof. Additionally, while any number of fiber tows may be used to construct core fibers 52, in one embodiment there may be from about 100 to about 5000 fiber tows used to construct core fibers 52. Moreover, each fiber tow may comprise from about 3000 to about 24,000 fiber filaments. In general, when assembled, core fibers 52 may constitute about half of the overall thickness T of mounting flange 46. While the thickness of mounting flange 46 may vary according to application, in one embodiment, mounting flange 46 may have a thickness of from about 0.5 inches (1.27 cm) to about 1 inch (2.54 cm).

As explained previously, in addition to circumferential core fibers 52, each mounting flange 46 may also include at least one layer of attachment fibers 54 operably connecting each of first core side 56 and second core side 58 of core fibers 52 to fan casing 16. Unlike core fibers 52, attachment fibers 54 may be constructed of multidirectional textile preforms, such as weaves or braids, that need not have a majority of fiber tows oriented circumferentially. In this way, attachment fibers 54 can display a generally uniform strength distribution throughout. As with the core fibers, each fiber tow of attachment fibers 54 may comprise from about 3000 to about 24,000 fiber filaments. Generally, when assembled, attachment fibers 54 may constitute the remaining half of the overall thickness of flange 46.

Figure 5:
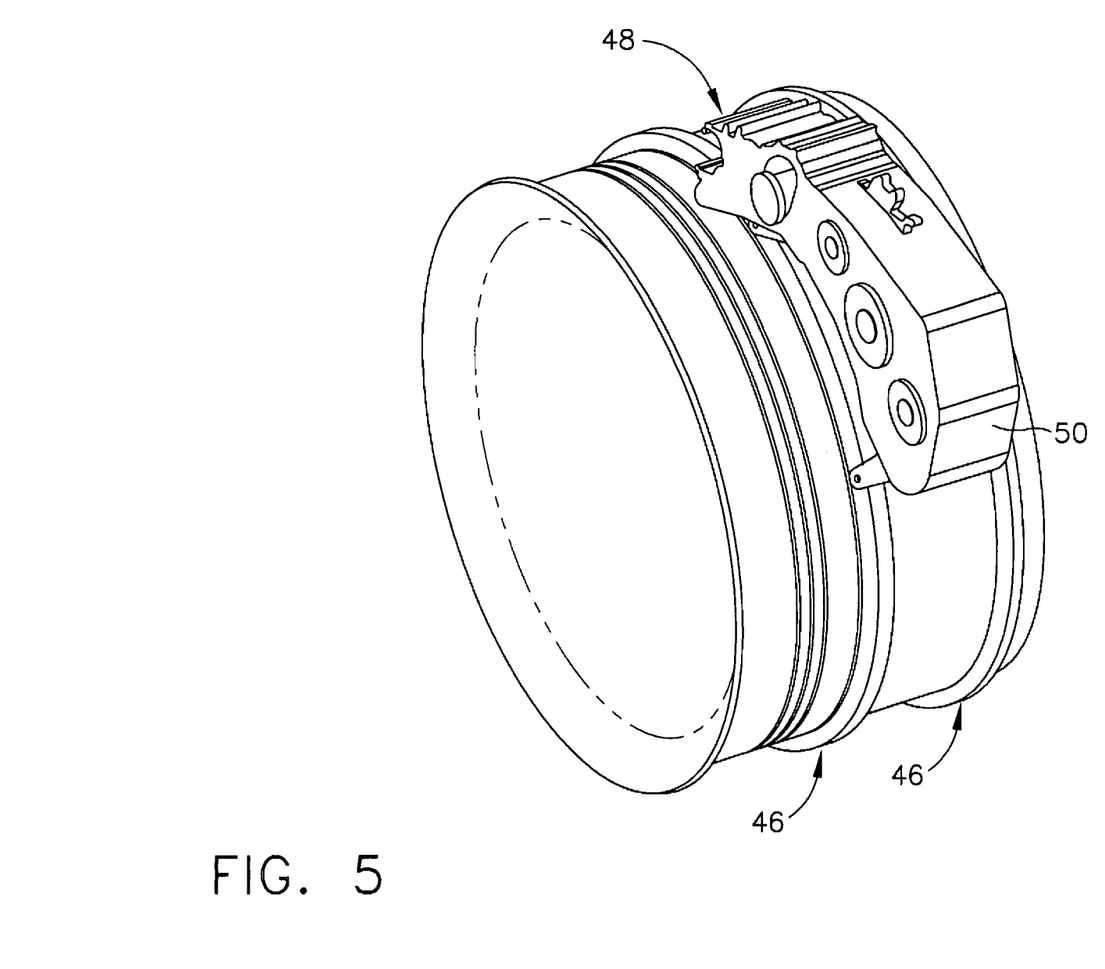
FIG. 5 is a schematic view of one embodiment of a fan casing having mounting flanges and attached secondary structure.

As illustrated in FIG. 5, mounting flange 46, once cured, may be used to operably connect at least one secondary structure 48 to fan casing 16 and thus, flange 46 may be located in a variety of locations along the length of body 40 of fan casing 16. In some instances, it may be desirable to include more than one mounting flange 46. As shown in FIG. 5, in one embodiment, secondary structure 48 may be, for example, an accessory gear box 50 that can be mounted to fan casing 16 using the mounting flanges 46 and any attachment method known to those skilled in the art, such as bolts. Other possible secondary structures may include, but are not limited to, an oil tank, oil and fuel monitoring modules, other engine externals and combinations thereof. It will be understood that "engine externals" refers to any accessory, module or component that may be connected to the outside of the engine. Such secondary structures may be constructed of any acceptable material known to those skilled in art such as, for example, aluminum, and as described previously may weigh significantly more than the corresponding fan casing to which they are attached. For example, in one embodiment, fan casing 16 may weight about 200 pounds while accessory gear box 50 may weigh about 300 pounds.

Embodiments of the mounting flange described herein can provide several benefits over existing attachment mechanisms. In particular, the integral mounting flange can reduce the occurrence of severe part damage to both the primary composite structure, as well as the attached secondary structure, while concurrently helping to eliminate catastrophic part failure. Without intending to be limited by theory, it is believed that, in general, fiber-reinforced composite structures, such as the mounting flanges herein, can have relatively weak interfaces between fiber layers and, therefore, have relatively weak through-thickness strength compared to their in-plane strength. If stresses on the composite structure exceed a defined maximum capacity level, these fiber layers can have a tendency delaminate, or separate, prior to actual fiber breakage occurring. This delamination or separation can reduce the load and stress on the attachment joint where the mounting flange connects to the primary structure. As will be understood by those skilled in the art the maximum stress capacity level of the primary composite structure can vary depending on such factors as materials of fabrication, method of fabrication and the like.

Embodiments set forth herein are designed take advantage of the previously described phenomenon. More specifically, the integral mounting flange may be fabricated to permit delamination, or even separation, of the flange from the primary composite structure at the joint under excessive stresses, such as those caused by a fan blade out or by the weight of an attached secondary structure. However, because the core fibers of the flange can be constructed from continuous, circumferentially oriented fibers, even after delaminating or separating, the flange can remain a movable yet intact ring about the primary structure. Thus, even if the integral mounting flange delaminates or separates from the primary composite structure, it generally remains in place with all secondary structures attached. This can allow stresses on both the primary composite structure and the mounting flange to be reduced while maintaining the attached secondary structure in the same general placement as originally intended. Because of this, the delamination or separation can reduce damage to both the primary and secondary structures, as well as help to prevent catastrophic part failure.

Methods of Fabricating Integral Composite Mounting Flange

Figure 6:
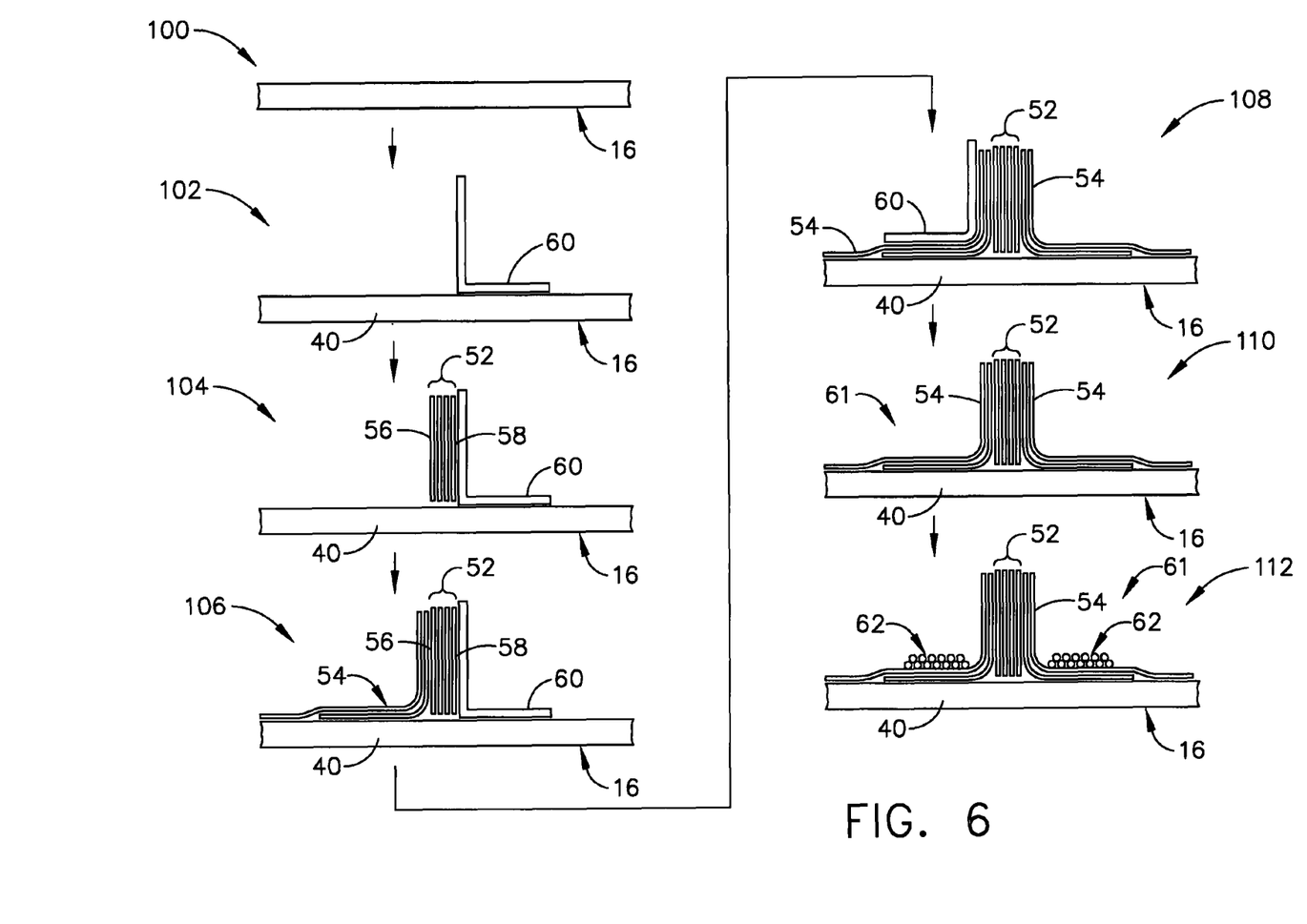
FIG. 6 is a schematic representation of one embodiment of a process for fabricating a mounting flange.

Fabricating a mounting flange as set forth herein may generally comprise applying core fibers about the primary composite structure, followed by applying attachment fibers to operably connect the core fibers to the fan casing, or other primary composite structure. More specifically, as shown in FIG. 6, step 100, the fabrication of a mounting flange may begin with providing a primary composite structure having a circumference, such as fan casing 16. In one embodiment, the primary composite structure may be complete except for final cure. In step 102, a correspondingly shaped guide 60 may then be placed about body 40 of fan casing 16 in each location where a mounting flange is desired. Guide 60 may be removably held in place by shrink tape, for example. In one embodiment, guide 60 may be comprised of discrete arcuate members, each spanning about 180 degrees of body 40 of fan casing 16. The arcs of guide 60 may be releaseably connected together for easy placement and adjustment about fan casing 16. It will be understood, however, that guide 60 may be comprised of any number of pieces and have any shape that corresponds to the shape of the primary composite structure. Guide 60 can serve as a support for the later application of both the core fibers and the attachment fibers, as explained herein below. As previously mentioned, guide 60 may be circumferential and have an L-shaped cross-section as shown, and may be constructed from any rigid, lightweight material such as, for example, aluminum or composite.

In step 104, once all guides 60 have been placed in the desired locations about body 40 of fan casing 16, the application of core fibers 52 may be initiated. As previously discussed, core fibers 52 may comprise either unidirectional, circumferentially oriented fiber tows bundled and bonded together or textile preforms, such as a flattened biaxial braid sleeve, having a majority of continuous, circumferentially oriented fiber tows.

If unidirectional fiber tows are used to construct core fibers 52, the tows may comprise fiber filaments that can be wound about the fan casing 16. In general, a single tackified fiber tow can be precisely placed in the desired position about the fan casing and this process can be repeated until core fibers 52 have the desired size and shape. A debulking step may then be carried out to consolidate core fibers 52, as described herein below. Alternately, if textile preforms are used to construct core fibers 52, the textile layers can be layed-up and tackified on a flat, non-porous surface, such as a table or a tool. More specifically, the tackified textile layers can be stacked to form the core fibers' 52 desired thickness and height, while still being long enough to circumscribe the fan casing. After debulking, as set forth below, the consolidated textile layers remain flexible enough to allow the layers to be manually or mechanically shaped into the proper radius to fit the fan casing, or other primary composite structure. Regardless of which type of fibers are used, finished core fibers 52 may have first core side 56 and second core side 58.

Having positioned core fibers 52 in the desired location about fan casing 16, attachment fibers 54 may be applied to each of first core side 56 and second core side 58 of core fibers 52, as well as to fan casing 16 to operably connect core fibers 52 to fan casing 16. In step 106, guide 60 can be left in place while attachment fibers 54 are applied to, for example, first core side 56 of core fibers 52. As previously described, attachment fibers 54 may comprise multidirectional textile preform layers, such as weaves or braids. Layers of attachment fibers 54 may be wrapped against both first core side 56 of core fibers 52 and fan casing 16 until the desired thickness is obtained. More specifically, a liquid resin, such as an epoxy, may be applied to core fibers 52 and fan casing 16 to provide a tacky layer to which attachment fibers 54 may be applied. Next, a layer of attachment fibers 54 may be applied over the liquid resin. This process can be repeated until the desired thickness of attachment fibers 54 is achieved. Though attachment fibers 54 may have any thickness, in one embodiment, the thickness of attachment fibers may be from about 0.125 inches (about 0.3 cm) to about 0.25 inches (about 0.6 cm).

Once attachment fibers 54 have been applied to first core side 56 of core fibers 52 a debulk may again be performed to consolidate the construction thus far. In particular, reinforcing fibers, such as core fibers 52 and attachment fibers 54, may inherently have a substantial amount of bulk. In order to help prevent wrinkles and/or voids during the final cure of the composite, and to utilize near net shape tooling during the final cure, the fibers of the composite can be consolidated, or compressed, into a dimension that is closer to the desired final cured thickness. This consolidation occurs during debulk.

Debulk can be carried out using any common method known to those skilled in the art, such as, for example, by applying pressure to the composite fibers with either a vacuum bag, shrink tape, or other mechanical means. Resin applied to the fibers before debulk can help "tack," or lock, the fibers in place once the pressure is applied. If the tackified fibers cannot be consolidated as desired at room temperature, then heat may be applied to lower the viscosity of the resin. The resin may then better infiltrate the composite fibers and allowing the consolidation to be carried out to the desired degree. In one embodiment, the guide may be left in place during the debulk process to provide support during fabrication.

After debulk, guide 60 may be repositioned adjacent to the completed side of the flange for the application of attachment fibers 54 to the opposing side of the flange as shown in step 108. The previously described application and debulk of attachment fibers 54 may then be repeated on, for example, second core side 58 of core fibers 52, to obtain an integral composite mounting flange perform 61 in step 110.

Optionally, in one embodiment shown in step 112, additional individual fiber tows 62 may be applied to attachment fibers 54 of mounting flange preform 61 prior to final cure to provide additional hoop strength. Such fiber tows will not affect the final cure of the composite structure. However, to avoid limiting the weight-saving benefits provided by using composite materials, it may be desirable to minimize the use of additional individual fiber tows 62.

Once core fibers 52, attachment fibers 54, and optionally individual fiber tows 62, have been layed-up and debulked, each guide 60 can be removed and the final cure tooling can be placed about fan casing 16, including any flange performs, to serve as a mold during the curing process. As will be understood by those skilled in the art, the final cure tooling and process may vary according to such factors as resin used, part geometry, and equipment capability. However, in one embodiment, the tooling may comprise near net shape tooling, which not only helps prevent waste of raw material and machining time, but also eliminates having to machine into the attachment fibers, which could result in breaking the fibers and introducing weak points in the flange.

Figure 7:
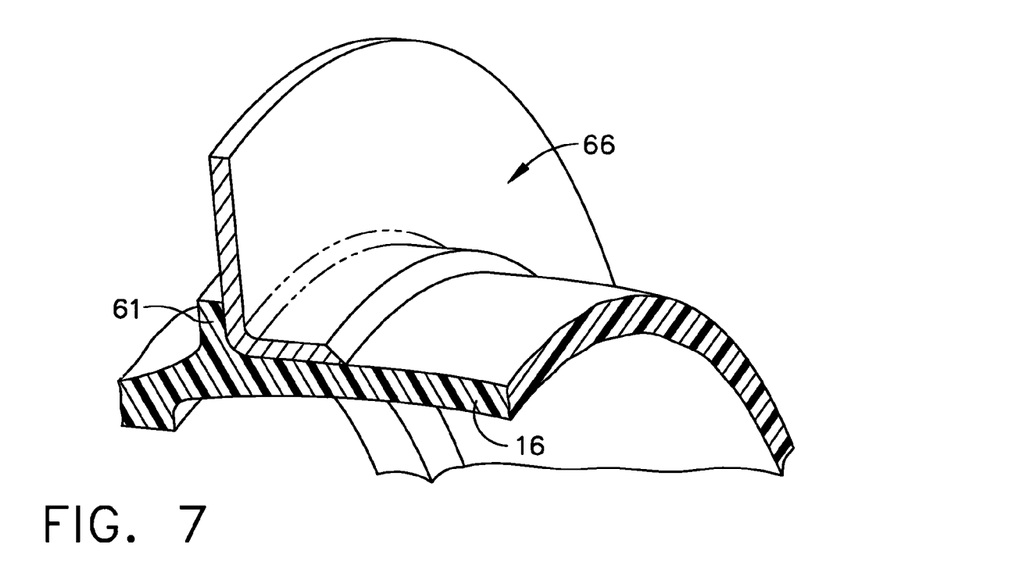
FIG. 7 is a schematic cross-sectional view of one embodiment of a flange shoe.
Figure 8:
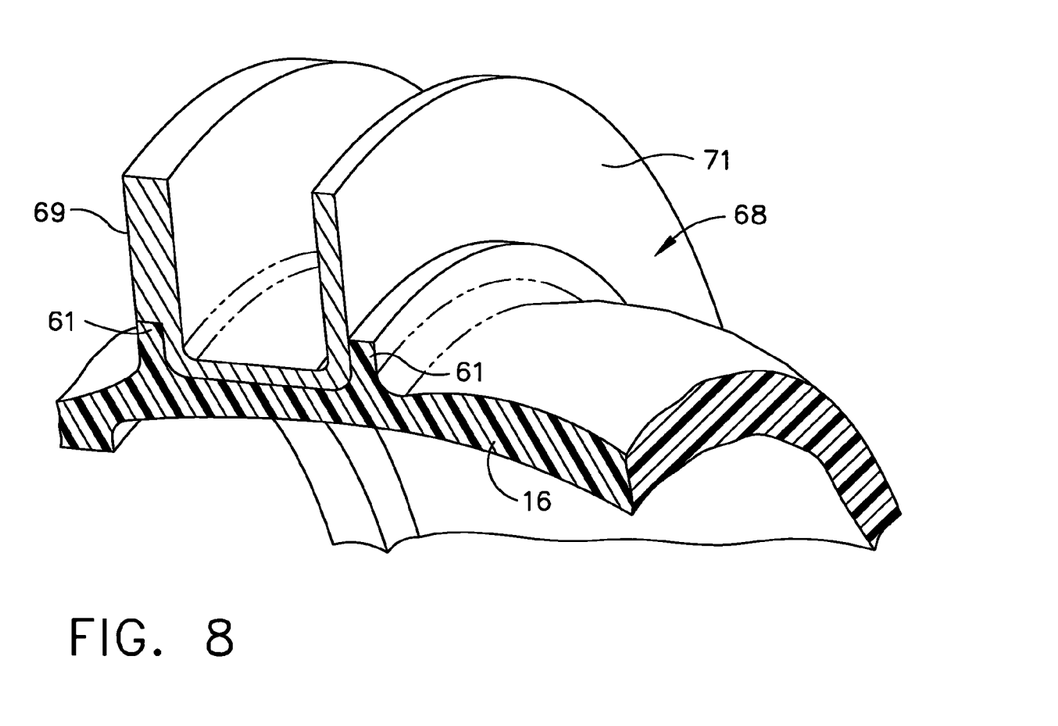
FIG. 8 is a schematic cross-sectional view of one embodiment of an extended flange shoe.

In general, the final cure tooling 64 may comprise various combinations of flange shoes and extended flange shoes. Flange shoes 66 may comprise any number of pieces that when coupled together may be positioned circumferentially about fan casing 16, and optionally mounting flange performs 61, and may comprise a substantially L-shaped cross-section, as shown in FIG. 7. Extended flange shoes 68, shown in FIG. 8, may have a first side 69 and a second side 71 and may also comprise any number of pieces that when coupled together may be positioned circumferentially about fan casing 16, and optionally mounting flange performs 61. Extended flange shoes 68 may comprise a substantially U-shaped cross-section, as shown in FIG. 8. Both flange shoes 66 and extended flange shoes 68 may be constructed of any material having a greater thermal coefficient of expansion than the fan casing preform. In one embodiment, flange shoes 66 and extended flange shoes 68 may be constructed from metals, alloys or combinations thereof, such as aluminum or steel. Additionally, as explained herein below, either or both of flange shoes 66 and extended flange shoes 68 may comprise a flange cavity to accommodate an end flange preform or a mounting flange preform.

Figure 9:
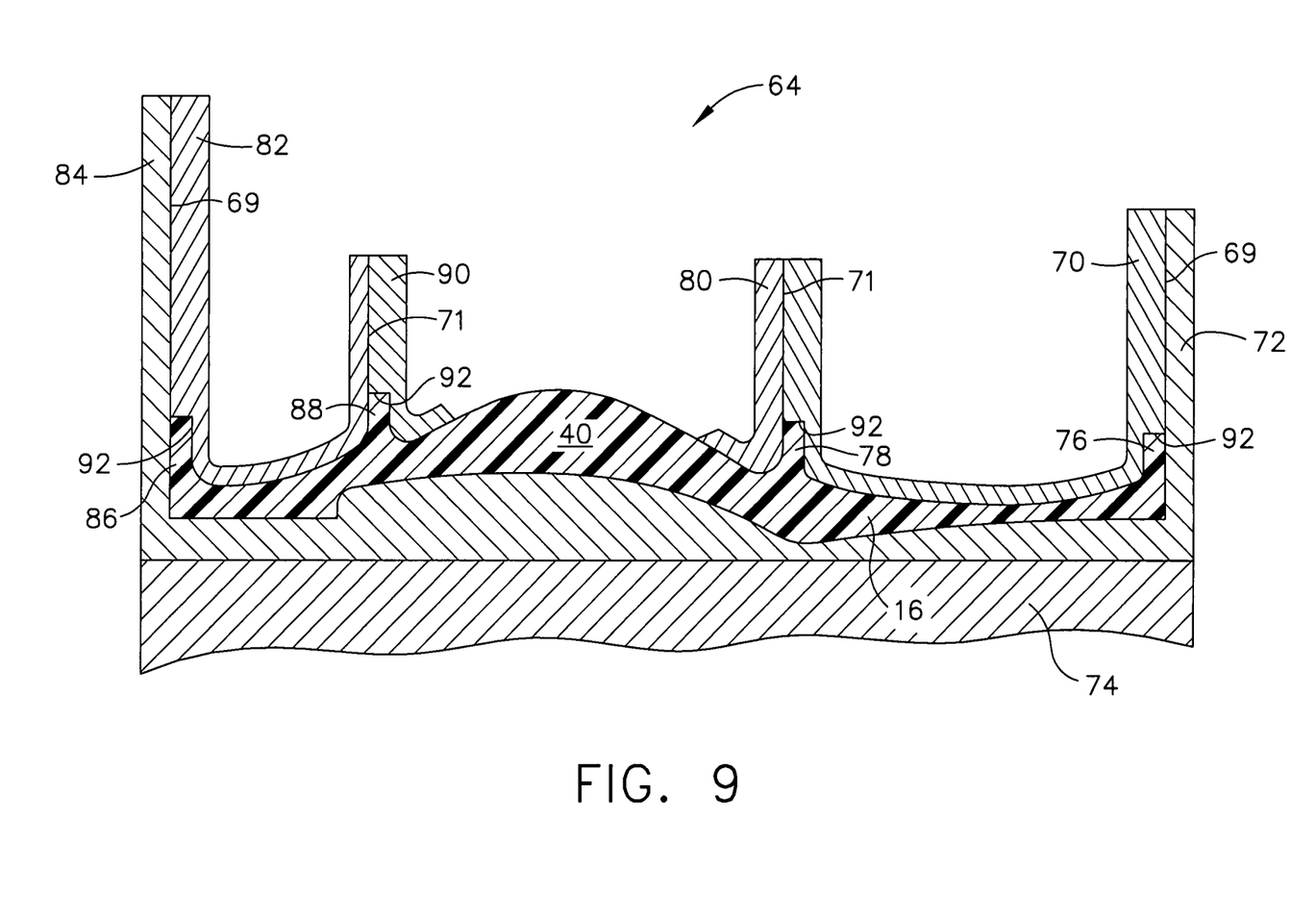
FIG. 9 is a schematic cross-sectional view of one embodiment of tooling used during final cure of a composite fan casing having two mounting flanges.

More particularly, as shown in FIG. 9, a first extended flange shoe 70 may be placed about fan casing 16 such that first side 69 of first extended flange shoe 70 is adjacent to a first endplate 72 of the composite structure-forming tool 74 upon which fan casing 16 is fabricated. First extended flange shoe 70 may be removeably coupled to the first endplate 72 using any attachment method known to those skilled in the art, such as, for example, bolts. Once positioned, first extended flange shoe 70 may overlay any first end flange preform 76 present, and continue along body 40 of fan casing 16 to a first mounting flange preform 78, as shown in FIG. 9. A first flange shoe 80 may then be positioned about fan casing 16, adjacent to second side 71 of first extended flange shoe 70 and the two may be removeably coupled together about first mounting flange preform 78. In this way, first extended flange shoe 70 can serve as an endplate to first flange shoe 80 and provide the support necessary to help ensure first flange shoe 80 remains in position such that first mounting flange preform 78 retains its desired shape and orientation about fan casing 16 during final cure.

As also shown in FIG. 9, a second extended flange shoe 82 may be placed about fan casing 16 such that a first side 69 of second extended flange shoe 82 is adjacent to a second endplate 84 of composite structure-forming tool 74. Second extended flange shoe 82 may be removeably coupled to the second endplate 84 in the same manner provided above for first extended flange shoe 70. Again, second extended flange shoe 82 may overlay any second end flange preform 86 present, and continue along body 40 of fan casing 16 to a second mounting flange preform 88, as shown in FIG. 9. A second flange shoe 90 may then be positioned about fan casing 16 adjacent to second side 71 of second extended flange shoe 82 and the two may be removeably coupled together about second mounting flange preform 88. As before, second extended flange shoe 82 can provide support to second flange shoe 90 and help ensure second flange shoe 90 remains in position such that second mounting flange preform 88 retains its desired shape and orientation about fan casing 16 during final cure.

For each coupling of an extended flange shoe and a flange shoe, there may also be a flange-shaped cavity formed to accommodate any mounting flange preform. It will be understood by those skilled in the art that cavity may be formed in a flange shoe, an extended flange shoe, or a combination thereof. For example, in FIG. 9, first extended flange shoe 70 contains a cavity 92 to accommodate first mounting flange preform 78 while second flange shoe 90 contains a cavity 92 to accommodate second mounting flange preform 88. Additional cavities 92 may be included to account for end flanges if present.

Figure 10:
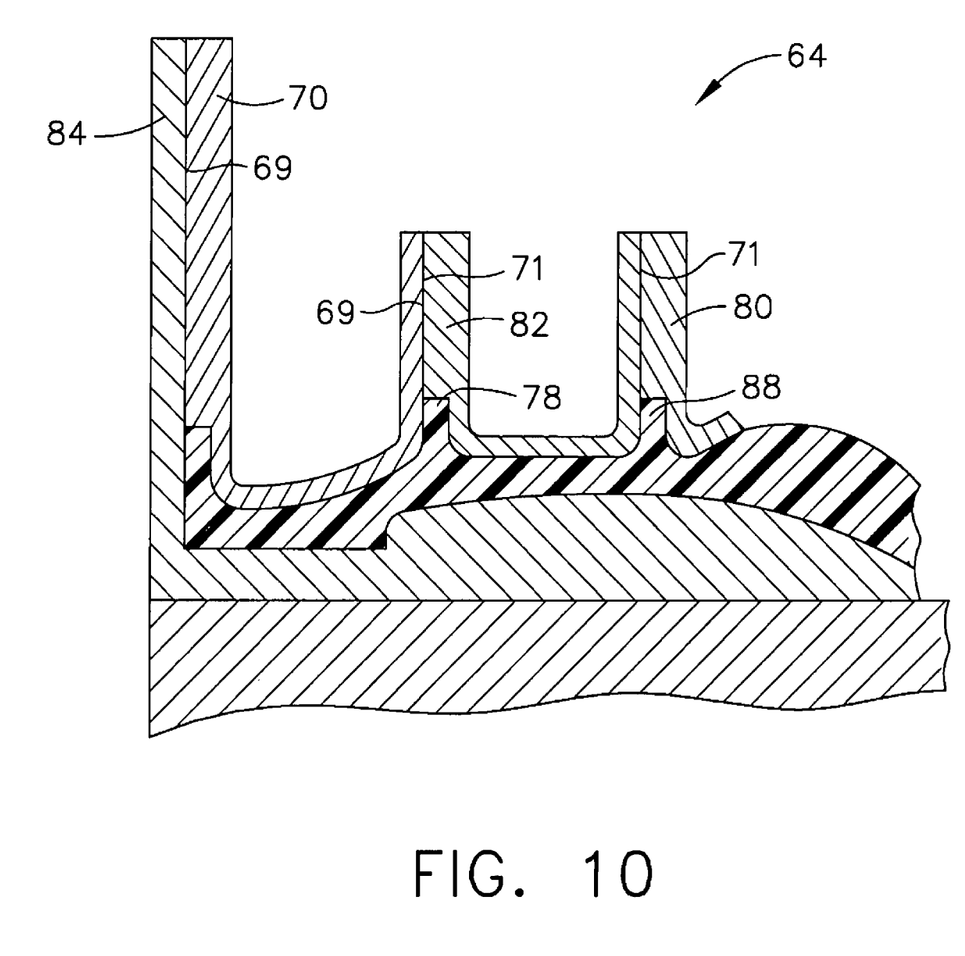
FIG. 10 is a portion of a schematic cross-sectional view of one embodiment of tooling used during final cure of a composite fan casing having two adjacent mounting flanges.

As shown in FIG. 10, if adjacent mounting flange performs are present, a first extended flange shoe 70, having a first side 69 and second side 71, may be removeably coupled to a second extended flange shoe 82, having a first side 69 and second side 71, to form a cavity 92 therebetween about a first mounting flange preform 78. A first flange shoe 80 may then be removeably coupled to second side 71 of second extended flange shoe 82 in the manner described above to form another cavity 92 about a second mounting flange preform 88. Indeed, any number of extended flange shoes may be coupled together in this manner to accommodate a fan casing having multiple adjacent mounting flange performs to help ensure the flange performs have the support needed to remain properly positioned and proportioned.

Once all flange shoes and extended flange shoes have been coupled together about the fan casing and the mounting flange performs, the final cure of the fan casing may commence. Those skilled in the art will understand how to determine the proper final cure parameters based on such factors as part size and resin utilized. At the end of the final cure, the tooling may be removed and an article including a composite structure having at least one mounting flange is obtained and any desired secondary structure may then be attached thereto.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An article comprising:
a gas turbine engine fan casing having a circumference and oppositely-disposed axial ends; and
at least one interposed mounting flange operably connected to the fan casing about the circumference thereof and between the axial ends of the fan casing, wherein the mounting flange comprises at least one circumferentially oriented core fiber that circumscribes the fan casing.

2. The article of claim 1 further comprising a secondary structure operably connected to the fan casing at the mounting flange.

3. The article of claim 1 wherein the fan casing comprises a material selected from the group consisting of glass fibers, graphite fibers, carbon fibers, ceramic fibers, aromatic polyamide fibers, and combinations thereof.

4. The article of claim 1 wherein the mounting flange comprises a plurality of core fibers selected from the group consisting of unidirectional fiber tows, textile preforms, and combinations thereof, and wherein a majority of the plurality of core fibers circumscribe the fan casing and are continuous in a circumferential direction thereof.

5. The article of claim 1 wherein the mounting flange further comprises at least one layer of attachment fibers that operably connect the core fiber to the fan casing.

6. The article of claim 1 wherein the core fiber comprises a plurality of unidirectional fiber tows.

7. The article of claim 5 wherein the attachment fibers comprise multidirectional textile preforms.

8. An article comprising:
a gas turbine engine fan casing having an outer circumference and oppositely-disposed axial ends;
at least one interposed mounting flange on the outer circumference of the fan casing between the axial ends thereof, the mounting flange comprising:
at least one circumferentially oriented core fiber that circumscribes the fan casing; and
at least one layer of attachment fibers operably connecting the core fiber to the fan casing about the circumference and wherein the mounting flange comprises a material selected from the group consisting of glass fibers, graphite fibers, carbon fibers, ceramic fibers, aromatic polyamide fibers, and combinations thereof.

9. The article of claim 8 further comprising a secondary structure operably connected to the outer circumference of the fan casing at the mounting flange.

10. The article of claim 8 wherein the core fiber further comprise a first core side and a second core side and wherein at least one layer of attachment fibers operably connects each of the first core side and the second core side of the core fiber to the fan casing about the circumference thereof.

11. The article of claim 8 wherein the mounting flange comprises a plurality of core fibers comprising unidirectional fiber tows and a majority thereof circumscribe the fan casing and are continuous in a circumferential direction thereof.

12. The article of claim 8 wherein the core fiber comprises textile performs.

13. An article comprising:
an engine comprising:
a fan casing having an outer circumference and oppositely-disposed axial ends;
at least one interposed mounting flange operably connected to the fan casing about the outer circumference thereof and between the axial ends thereof, the mounting flange comprising:
a plurality of circumferentially oriented core fibers that circumscribe the fan casing, the core fibers having a first core side and a second core side;
at least one layer of attachment fibers operably connecting each of the first core side and the second core side of the core fibers to the fan casing about the circumference; and
a secondary structure operably connected to the fan casing at the mounting flange and wherein the mounting flange comprises a material selected from the group consisting of glass fibers, graphite fibers, carbon fibers, ceramic fibers, aromatic polyamide fibers, and combinations thereof.

14. The article of claim 13 wherein the core fibers comprise unidirectional fiber tows.

15. The article of claim 13 wherein the secondary structure is a structure selected from the group consisting of an accessory gear box, an oil tank, an oil monitoring module, a fuel monitoring module, other engine externals and combinations thereof.

16. The article of claim 13 wherein a majority of the plurality of circumferentially core fibers circumscribe the fan casing and are continuous in a circumferential direction thereof.

17. The article of claim 4 wherein the mounting flange further comprises at least first and second layers of multidirectional attachment fibers that attach the plurality of core fibers to the fan casing to define a joint therebetween, the first layer of multidirectional attachment fibers is attached with a cured resin to the fan casing and to a first core side defined by the plurality of core fibers, the second layer of multidirectional attachment fibers is attached with a cured resin to the fan casing and to a second core side defined by the plurality of core fibers opposite the first core side, and the first and second layers of multidirectional attachment fibers delaminate from the plurality of core fibers to define an intact ring when the joint is subjected to stresses.

* * * * *